Jan. 1, 1929.

W. S. JAMES

SPRING SHACKLE

Original Filed March 18, 1927

1,697,066

INVENTOR.
William S. James
BY
*P. W. Pomeroy*
ATTORNEY

Patented Jan. 1, 1929.

1,697,066

UNITED STATES PATENT OFFICE.

WILLIAM S. JAMES, OF SOUTH BEND, INDIANA, ASSIGNOR TO THE STUDEBAKER CORPORATION, OF SOUTH BEND, INDIANA, A CORPORATION OF NEW JERSEY.

SPRING SHACKLE.

Original application filed March 18, 1927, Serial No. 176,570. Divided and this application filed November 11, 1927. Serial No. 232,594.

This invention relates to elastic or resilient connections, and is a division of my co-pending application filed March 18, 1927, Serial No. 176,570. This invention relates particularly to spring shackle connections, and more particularly to that type in which the resilient qualities may be varied and adjusted, the principal object being to provide an elastic or resilient connection with means for varying the resilient characteristics thereof.

Another object is to provide an elastic or resilient spring shackle connection, in which the resilient material thereof is confined within a closed space, with means for adjustably controlling the volume of the space whereby the density of resilient material confined therein may be varied to best suit conditions in which the connection is used.

The above being among the objects of the present invention, the same consists of certain features of construction and combinations of parts to be hereinafter described with reference to the accompanying drawing, and then claimed, having the above and other objects in view.

Figure 1:
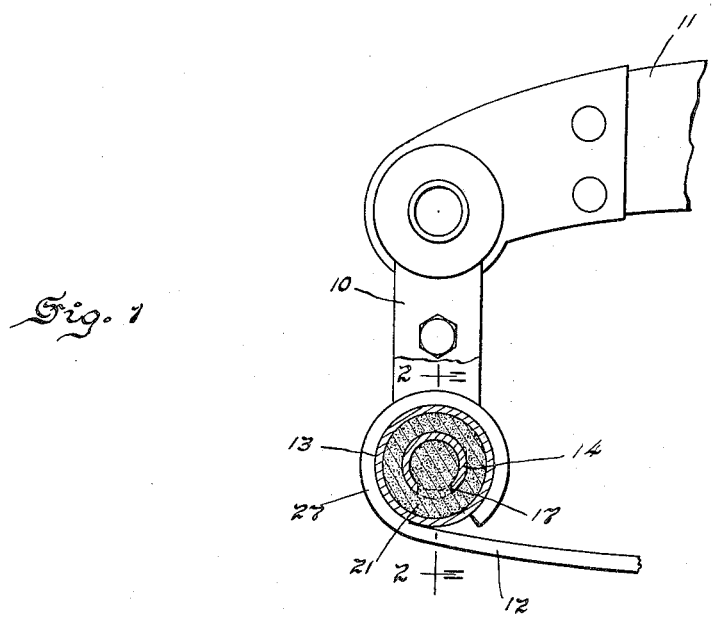
Figure 1 is a fragmentary side view of an automobile side frame member and co-operating spring showing a shackle connecting the same, the connection between the spring and shackle links being of a resilient nature and shown in section.
Figure 2:
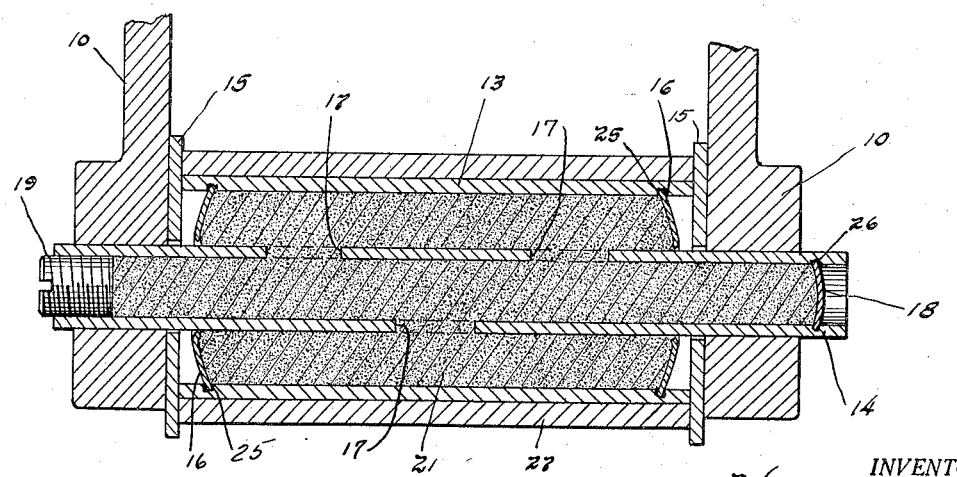
Figure 2 is a sectional view of the connection between the shackle and spring eye, taken on the line 2—2 of Figure 1.

In resilient connections commonly employed between relatively movable parts such as spring shackles and the like, it has often been found necessary to change the resilient characteristics of the same in order that the most advantageous results may be obtained from the devices so connected or from the resilient connection itself. In such connections, it is the usual practice to employ rubber as the resilient element therein, and when it becomes necessary to change the resilient characteristics of the connection, it has been the usual practice to change the grade or composition of the rubber to obtain the desired degree of resiliency. A single resilient connection may be adaptable for use in a variety of different parts or objects and it will be evident that it is extremely difficult in such a case, to provide a grade of rubber which will be satisfactory for all uses to which such connection may be adapted.

It is the principal object of the present invention, to provide means for use with such connections whereby a single grade of rubber or similar resilient material may be employed and the resilient characteristics thereof may be adjusted to best suit the need of any construction with which the connection may be used.

Rubber is but slightly compressible and on the other hand it is extremely distortable, and it is this last characteristic which has probably caused the general belief in regard to its compressibility. Many constructions have been provided where means were employed for drawing down or squeezing the rubber together, but so far as I have been able to determine, in all such constructions, the rubber was not confined within a restricted space but on the contrary, there were apertures or spaces through which the rubber might extrude, for which reason its resilient characteristics were affected but slightly if any, when it was attempted to compress the same. I have found that if in such connections the rubber is positioned in a closed space without any openings or spaces through which the rubber may extrude upon being compressed, if the volume of such space is decreased thereby compressing the rubber, the resilient characteristics of the rubber are materially changed, the density of the rubber being increased upon compression and its limit of elasticity accordingly diminished. I have made use of this fact in connection with spring shackles which employ rubber as the resilient element.

In accordance with the present invention, I construct the connections in such a manner that the resilient element or elements thereof are confined within a closed space devoid of any openings or spaces through which the rubber may have an opportunity of extruding and I provide ready adjustable means for varying the area of such spaces whereby the resiliency of the rubber contained therein may be varied and the resilient characteristics of such connection may be readily adjusted and controlled to most suitably correspond to the use to which it is put.

Referring to the accompanying drawing, in which like numerals refer to like parts throughout the several views, I show the present invention incorporated in a motor vehicle spring shackle. As in conventional structures, the links 10 are provided for shackling the end of the frame side member 11 to the end of the spring 12, but the construction as shown discloses certain novel features in the connection between the link and the spring end, and between the link 10 and the end of the frame member 11. As the construction at both ends of the link 10 is substantially the same, only one end will be described, it being kept in mind that the other end is substantially identical.

The usual shackle bolt of conventional construction is replaced in the construction shown, by an outer shell 13 of a length commensurate with the width of the spring 12, and non-rotatably embraced within the eye 27 formed at the end of same. Positioned within the sleeve 13 and co-axial therewith, is a smaller sleeve 14 provided with a substantial space between its outer surface and the interior wall of the sleeve 13. The ends of the sleeve 14 project outwardly beyond the ends of the sleeve 13 and are non-rotatably received within the ends of the links 10. The washers 15, preferably of the type possessing dry lubricating qualities, are positioned between the ends of the sleeve 13 and the adjacent links 10. Expansion washers 16 are secured in the circumferential grooves 25, within the ends of the sleeve 13 and have central openings therein adapted to receive the sleeve 14 in sliding contact with the outer surface thereof.

The inner sleeve 14 is provided with a plurality of slotted openings 17 connecting its interior with the space between its outer surface and the sleeve 13 between the expansion washers 16 which serve to seal the ends of the sleeve 13. One end of the sleeve 14 is provided with an expansion plug 18 seated in a groove 26, which seals that end, the other end being provided with an adjustable plug 19 threaded into that end of the sleeve. The interior of the sleeve 14 and the space between this sleeve and the sleeve 13 between the expansion washers 16 together with the openings 17, are completely filled with rubber 21 or material having similar characteristics which is preferably vulcanized or otherwise bonded to the contacting surfaces.

In this construction, it will be apparent that there is no rubbing action of the parts connecting the shackle link 10 to the end of the spring 12 as is the case in conventional construction where a plain shackle bolt is used, instead in this construction upon movement of the spring 12, the rubber between the inner sleeve 14 and the outer sleeve 13 is distorted to permit this movement and consequently there is no moving contact between the parts and no friction surfaces to require lubrication. In this type of shackle construction as in any other type of resilient connection, one application of the same may require different resilient characteristics of the rubber. For instance, a vehicle adapted to carrying a heavy load and equipped with stiff springs would require a rubber mounting of less resiliency than one adapted to lighter loads. The resilient characteristic of the rubber must be adjusted to such a degree as will best adapt it to resist and cushion the torque to which it is subjected.

The construction shown provides means whereby the resiliency of the rubber may be varied or adjusted to best conform with the needs of each individual connection. This is accomplished by threading the plug 19 either inwardly into the sleeve 14 to diminish the resiliency of the rubber, or outwardly to increase it. For instance, should less resiliency of the rubber be required, the plug 19 may be threaded further into the sleeve 14 in which case the rubber will be forced ahead of the plug 19 and will be compressed, sufficient rubber passing through the openings 17 in the sleeve 14 to cause a like compression in the space between the inner sleeve 14 and the outer sleeve 13. The openings 17 allowing means for equalization of the degree of compression on both sides of the walls of the sleeve 14. Similarly greater resiliency of the rubber may be obtained by backing the plug 19 further out of the sleeve 14 and thereby allowing greater room for expansion, and making the resilient material more easily distortable.

From the foregoing description, it will be readily apparent that the present invention provides ready and easy means for varying the resilient characteristics of resilient connections employing rubber or similar material as the elastic element and so permit such points to be readily adaptable to the particular construction in which they are employed. The present invention is easily adaptable to practically all conventional forms of resilient connections and in addition provides a connection which is simple in structure, economical to manufacture and highly efficient in use.

Formal changes may be made in the specific embodiment of the invention described without departing from the spirit or substance of the broad invention, the scope of which is commensurate with the appended claims.

What I claim is:

1. In a spring shackle, a pair of spaced concentric sleeves movable relative to each other, closures for the ends of said sleeves, apertures in the inner of said sleeves connecting the interior thereof with the interior of the outer of said sleeves, and a resilient material filling the connected interiors of said sleeves to allow movement of one of said sleeves relative to the other of said sleeves.

2. In a spring shackle, a pair of spaced concentric sleeves movable relative to each other, closures for the ends of said sleeves, apertures in the inner of said sleeves connecting the interior thereof with the interior of the outer of said sleeves, a resilient material filling the connected interiors of said sleeves, and means for varying the volume of said resilient material whereby the resilient characteristics thereof are changed.

3. In a spring shackle, a pair of spaced concentric sleeves movable relative to each other, closures for the ends of said sleeves, apertures in the wall of the inner of said sleeves connecting the interior thereof with the interior of the outer of said sleeves, a resilient material filling the connected interiors of said sleeves to allow movement of one of said sleeves relative to the other thereof, one of said closures for the inner of said sleeves being movable longitudinally thereof to vary the volume of said resilient material filling said connected interiors to change the resilient characteristics thereof.

4. In a spring shackle, a pair of spaced concentric sleeves movable relative to each other, rigid closures for the ends of the outer of said sleeves, a rigid closure for one end of the inner of said sleeves, openings formed in the wall of said inner sleeve connecting the interior thereof with the interior of said outer sleeve, resilient material filling said connected interiors, and screw means threaded into the open end of said inner sleeve for varying the volume of said resilient material to change the resilient characteristics thereof.

5. In a shackle construction, a pair of concentric sleeves freely spaced from each other, one of said sleeves being positioned within the other of said sleeves, rigid closures for the open ends of the outer of said sleeves, a rigid closure for one end of the inner of said sleeves, openings connecting the interior of the inner sleeve with the space between the same and said outer sleeve, a rubber filling for the interior of both of said sleeves, and an adjustable plug in the open end of said inner sleeve for varying the combined volume of rubber enclosed by both of said sleeves.

6. In a motor vehicle, a frame side rail, a spring having an eye formed at one end thereof, and a shackle for connecting said spring with said side member, said shackle comprising an outer sleeve non-rotatably received in said spring eye, an inner sleeve spaced concentrically within said outer sleeve, shackle link secured to the ends of said inner sleeve, rigid closures for the ends of said outer sleeve, a rigid closure for one end of said inner sleeve, openings in the wall of said inner sleeve connecting the interior thereof with the interior of said outer sleeve, resilient material filling said connected interiors, and a plug threaded into the open end of said inner sleeve for varying the volume of said resilient material to change the resilient characteristics thereof.

7. In a motor vehicle, a frame side rail, a leaf spring having an eye formed at one end thereof, and a shackle for connecting said spring with said side member, said shackle comprising an outer sleeve non-rotatably received in said spring eye having inner circumferential grooves adjacent its ends, an inner sleeve spaced concentrically within said outer sleeve provided with an inner circumferential groove adjacent one end thereof, shackle links secured to the ends of said inner sleeve, annular expandable washers surrounding said inner sleeve seated in said grooves formed in said outer sleeve to close the ends thereof, a washer seated in said groove formed in said inner sleeve to close one end thereof, apertures in said inner sleeve connecting the interiors of said sleeves, rubber filling for said connected interiors to resiliently allow movement of one sleeve relative to the other, and a screw plug threaded into the open end of said inner sleeve, whereby said plug may be moved longitudinally of said inner sleeve for varying the volume of said rubber to change the resilient characteristics thereof.

Signed by me at South Bend, Indiana, this 8th day of November, 1927.

WILLIAM S. JAMES.